United States Patent
Chang

(10) Patent No.: US 6,584,695 B1
(45) Date of Patent: Jul. 1, 2003

(54) LASER ALIGNMENT DEVICE OF A CIRCULAR SAW

(76) Inventor: Chin-Chin Chang, No. 2, Alley 113, Lane 967, San Feng Road, Feng Yuan, Taichung Hsien (TW)

( * ) Notice: Subject to any disclaimer, the term of this patent is extended or adjusted under 35 U.S.C. 154(b) by 2 days.

(21) Appl. No.: 10/040,715

(22) Filed: Jan. 2, 2002

(51) Int. Cl.[7] ................................................. B27B 9/04
(52) U.S. Cl. ....................................................... 30/391
(58) Field of Search ........................... 30/123, 388, 390, 30/391; 83/471.2, 520; 362/119

(56) References Cited

U.S. PATENT DOCUMENTS

| | | | | |
|---|---|---|---|---|
| 4,833,782 A | * | 5/1989 | Smith | 30/392 |
| 5,375,495 A | * | 12/1994 | Bosten et al. | 83/520 |
| 5,461,790 A | * | 10/1995 | Olstowski | 30/391 |
| 5,949,810 A | * | 9/1999 | Star et al. | 372/108 |
| 5,996,460 A | * | 12/1999 | Waite | 83/520 |

FOREIGN PATENT DOCUMENTS

DE          39 22849 A1  *  1/1991

* cited by examiner

Primary Examiner—Hwei-Siu Payer
(74) Attorney, Agent, or Firm—Connolly Bove Lodge & Hutz, LLP

(57) ABSTRACT

The present invention relates to a laser alignment device of a circular saw, including a rotary disk base, a protective cover, and a magnetic ring base. The rotary disk base is mounted on a drive shaft of a circular saw. The rotation shaft of the motor may rotate the drive shaft to rotate the rotary disk base, so that the rotary disk base may be rotated at a high speed, and the silicon steel plates and the armature coil of the rotary disk base may be rotated at a high speed. Thus, an induced current may be produced between the silicon steel plates and the armature coil of the rotary disk base and the stator member of the magnetic ring of the magnetic ring base, so as to provide an electrical energy to the laser generator.

4 Claims, 3 Drawing Sheets

LASER ALIGNMENT DEVICE OF A CIRCULAR SAW

BACKGROUND OF THE INVENTION

1. Field of the Invention

The present invention relates to a laser alignment device of a circular saw, and more particularly to a laser alignment device of a circular saw, wherein the laser alignment device may generate electricity automatically by rotation of the rotation shaft of the motor, so as to provide an electrical energy to the laser generator, so that the laser generator may emit the laser light, without having to additionally provide the battery to provide an electrical energy to the laser generator.

2. Description of the Related Art

A conventional laser alignment device is disclosed in the Taiwanese Patent Publication No. 233852, the Taiwanese Patent Publication No. 343010, and the Taiwanese Patent Publication No. 413323. However, the conventional laser alignment device needs to additionally mount the battery to provide an electrical energy required for exciting the laser light, so that the conventional laser alignment device needs to replace battery frequently. In addition, the conventional laser alignment device cannot be mounted on a circular saw directly.

SUMMARY OF THE INVENTION

The primary objective of the present invention is to provide a laser alignment device of a circular saw, wherein the laser alignment device may generate electricity automatically by rotation of the rotation shaft of the motor, so as to provide an electrical energy to the laser generator, so that the laser generator may emit the laser light, without having to additionally provide the battery to provide an electrical energy to the laser generator. Thus, the laser alignment device of a circular saw in accordance with the present invention does not have the problem of needing to replace the battery.

Another objective of the present invention is to provide a laser alignment device of a circular saw, wherein the light permeable hole of the rotary disk base is in parallel with and close to the circular saw blade, so that the laser light indication line generated by the laser generator may be projected on a predetermined cutting position of the circular saw blade exactly, thereby facilitating the operator cutting the workpiece, and thereby enhancing the exactness and precision of cutting the workpiece.

In accordance with the present invention, there is provided a laser alignment device of a circular saw, comprising a rotary disk base, a protective cover, and a magnetic ring base, wherein:

the rotary disk base is provided with a hollow lug protruded outward therefrom, the hollow lug has a shaft hole for passage of a drive shaft of a circular saw, multiple silicon steel plates are secured on the hollow lug, an armature coil is mounted around the hollow lug between the silicon steel plates, the rotary disk base is provided with a laser generator, the rotary disk base is formed with a light permeable hole aligned with the laser generator, the light permeable hole of the rotary disk base is in parallel with and close to a circular saw blade of the circular saw, so that the laser light emitted from the laser generator may be projected on a predetermined cutting position of the circular saw blade exactly;

the protective cover is screwed on the rotary disk base to cover and fix the rotary disk base, thereby providing a dustproof and positioning effect;

the magnetic ring base is secured to a gear box of an end side of a motor, and is provided with a stator member of a magnetic ring, the stator member of the magnetic ring of the magnetic ring base is mounted around a periphery of a rotor member of the silicon steel plates of the rotary disk base, thereby forming a rotation generator mechanism between the rotor member and the stator member of the generator; and the circular saw blade and a housing may be serially mounted on the other side of the rotary disk base, the drive shaft of the circular saw may be in turn extended through the circular saw blade and the housing, and may be screwed with a bolt, thereby mounting the circular saw blade and the housing on the drive shaft of the circular saw integrally.

Further benefits and advantages of the present invention will become apparent after a careful reading of the detailed description with appropriate reference to the accompanying drawings.

DETAILED DESCRIPTION OF THE INVENTION

Figure 1:
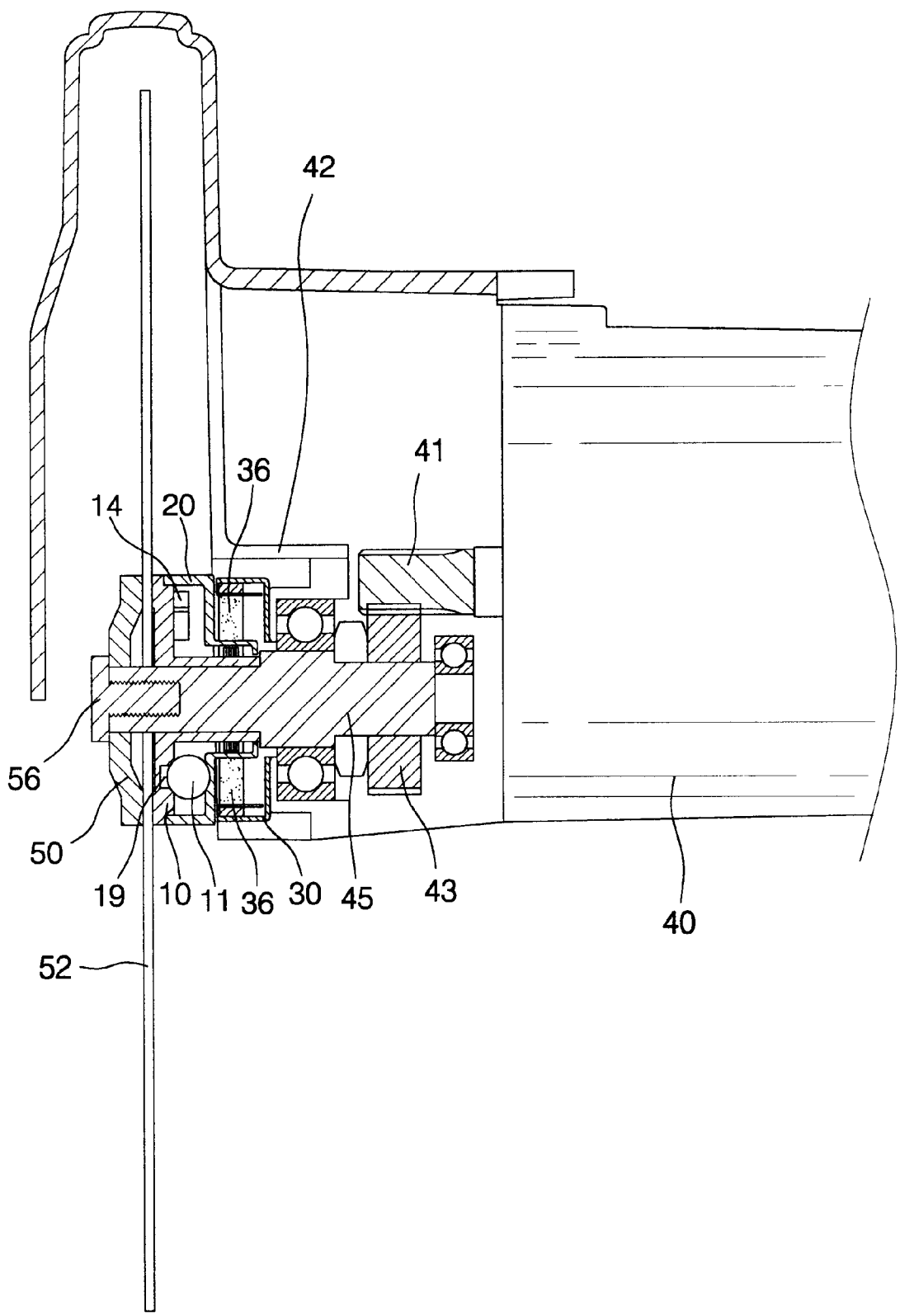
FIG. 1 is a plan cross-sectional view of a laser alignment device of a circular saw in accordance with a preferred embodiment of the present invention.
Figure 2:
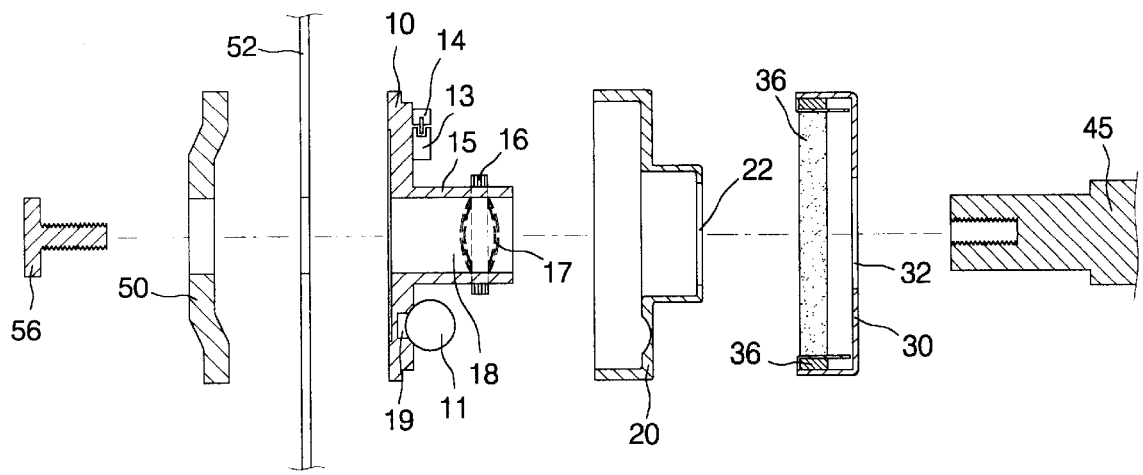
FIG. 2 is a plan exploded view of a laser alignment device of a circular saw in accordance with a preferred embodiment of the present invention.
Figure 3:
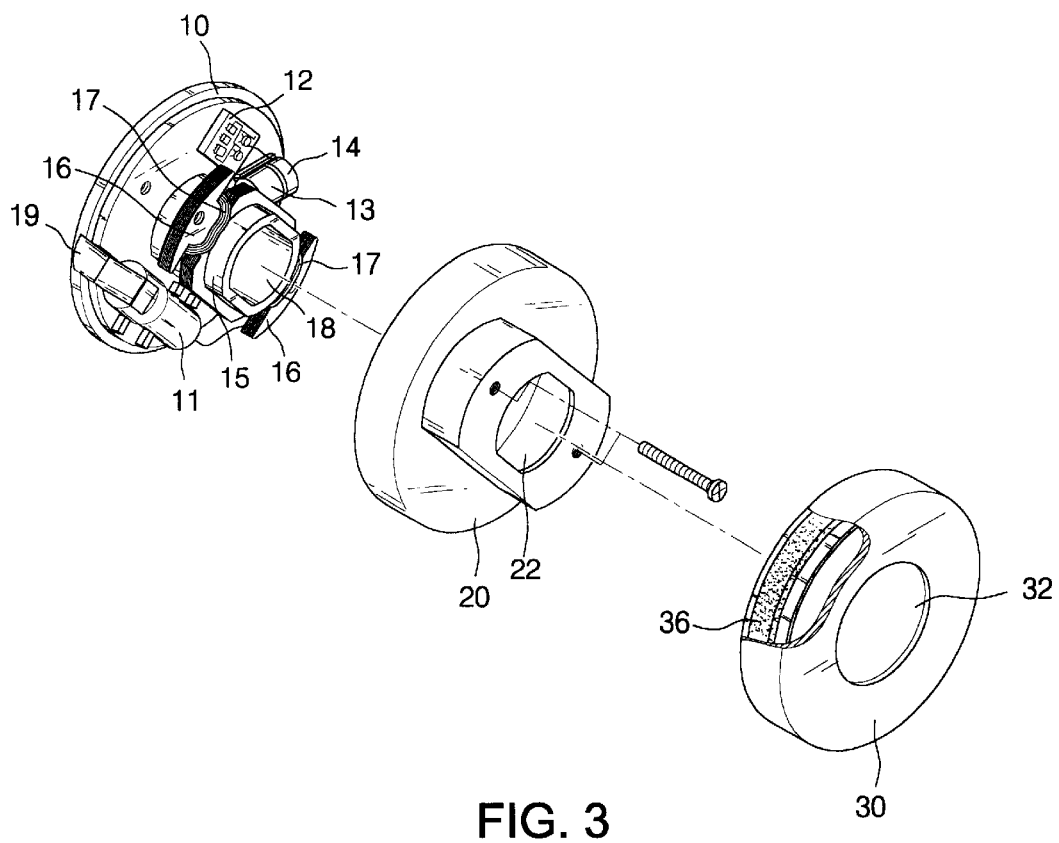
FIG. 3 is an exploded perspective view of a laser alignment device of a circular saw in accordance with a preferred embodiment of the present invention.
Figure 4:
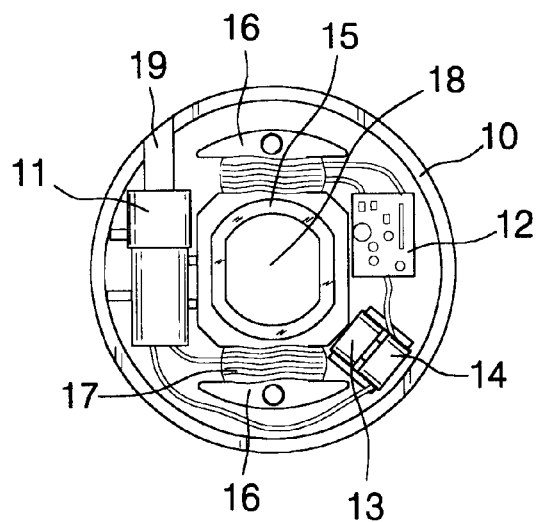
FIG. 4 is a front plan assembly view of the laser alignment device of a circular saw as shown in FIG. 3.
Figure 5:
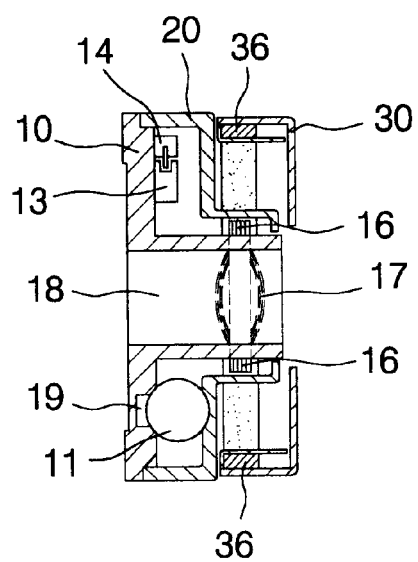
FIG. 5 is a side plan cross-sectional assembly view of the laser alignment device of a circular saw as shown in FIG. 3.

Referring to the drawings, a laser alignment device of a circular saw in accordance with a preferred embodiment of the present invention comprises a rotary disk base 10, a protective cover 20, and a magnetic ring base 30.

The rotary disk base 10 is provided with a hollow lug 15 protruded outward therefrom. The hollow lug 15 has a shaft hole 18 for passage of a drive shaft 45 of a circular saw. Multiple silicon steel plates 16 are secured on the hollow lug 15, and an armature coil 17 is mounted around the hollow lug 15 between the silicon steel plates 16. The rotary disk base 10 is provided with a laser generator 11, a circuit board 12, and a press switch 14. The press switch 14 has an inner side elastically rested on a slide press block 13. When the rotary disk base 10 is rotated at a high speed, the slide press block 13 may be driven to slide outward due to a centrifugal action to touch and press the press switch 14, thereby forming an electrically connection state. The circuit board 12 has a current rectification and voltage stabilization effect.

The rotary disk base 10 is formed with a light permeable hole 19 aligned with the laser generator 11, so that the laser light generated by the laser generator 11 may pass through the light permeable hole 19 of the rotary disk base 10, to produce a laser light indication line that may be projected on a workpiece to be cut, thereby facilitating the operator cutting the workpiece, and thereby enhancing the exactness and precision of cutting the workpiece.

The protective cover 20 is screwed on the rotary disk base 10 to cover and fix the rotary disk base 10, thereby providing a dustproof and positioning effect. The protective cover 20 is formed with a through hole 22 for passage of the hollow lug 15 of the rotary disk base 10.

The magnetic ring base 30 is secured to a gear box 42 of an end side of a motor 40, and is provided with a stator member of a magnetic ring 36. The stator member of the magnetic ring 36 of the magnetic ring base 30 is mounted around the periphery of the rotor member of the silicon steel plates 16 of the rotary disk base 10, thereby forming a rotation generator mechanism between the rotor member and the stator member of the generator, so as to provide an electrical energy to the laser generator 11. The magnetic ring base 30 is formed with a through hole 32 for passage of the drive shaft 45 of the circular saw.

The drive shaft 45 of the circular saw is located in the gear box 42 of the end side of the motor 40, and the rotation shaft 41 of the motor 40 is meshed with the gear 43 secured on the drive shaft 45 of the circular saw, whereby the rotation shaft 41 of the motor 40 may rotate the drive shaft 45 of the circular saw so as to rotate the rotary disk base 10, so that the rotary disk base 10 may be rotated at a high speed by the rotation force of the rotation shaft 41 of the motor 40, and the silicon steel plates 16 and the armature coil 17 of the rotary disk base 10 may also be rotated at a high speed by the rotation force of the rotation shaft 41 of the motor 40. Thus, an induced current may be produced between the silicon steel plates 16 and the armature coil 17 of the rotary disk base 10 and the stator member of the magnetic ring 36 of the magnetic ring base 30, so as to provide an electrical energy to the laser generator 11.

After the laser alignment device of the present invention is mounted on the drive shaft 45 of the circular saw, a circular saw blade 52 and a housing 50 may be serially mounted on the other side of the rotary disk base 10. Thus, the drive shaft 45 of the circular saw may be in turn extended through the mating shaft holes of the circular saw blade 52 and the housing 50, and may be screwed with a bolt 56, thereby mounting the circular saw blade 52 and the housing 50 on the drive shaft 45 of the circular saw integrally.

The light permeable hole 19 of the rotary disk base 10 is in parallel with and close to the circular saw blade 52, so that the laser light indication line generated by the laser generator 11 may be projected on a predetermined cutting position of the circular saw blade 52 exactly, thereby facilitating the operator cutting the workpiece, and thereby enhancing the exactness and precision of cutting the workpiece.

Accordingly, in the present invention, a laser alignment device is mounted on the drive shaft 45 of the circular saw. The laser alignment device of a circular saw in accordance with a preferred embodiment of the present invention comprises a rotary disk base 10, a protective cover 20, and a magnetic ring base 30.

The silicon steel plates 16 and the armature coil 17 of the rotary disk base 10 may be rotated at a high speed by the rotation force of the rotation shaft 41 of the motor 40, so that an induced current may be produced between the silicon steel plates 16 and the armature coil 17 of the rotary disk base 10 and the stator member of the magnetic ring 36 of the magnetic ring base 30, so as to provide an electrical energy to the laser generator 11. Thus, the laser alignment device of a circular saw in accordance with the present invention may generate electricity automatically by rotation of the rotation shaft 41 of the motor 40, so as to provide an electrical energy to the laser generator 11, so that the laser generator 11 may emit the laser light, without having to additionally provide the battery to provide an electrical energy to the laser generator 11. Thus, the laser alignment device of a circular saw in accordance with the present invention does not have the problem of needing to replace the battery. In addition, The light permeable hole 19 of the rotary disk base 10 is in parallel with and close to the circular saw blade 52, so that the laser light indication line generated by the laser generator 11 may be projected on a predetermined cutting position of the circular saw blade 52 exactly, thereby facilitating the operator cutting the workpiece, and thereby enhancing the exactness and precision of cutting the workpiece.

In conclusion, in accordance with the laser alignment device of a circular saw of the present invention, the laser alignment device is mounted on an end side of the drive shaft of the circular saw. The laser alignment device may use the rotation generator mechanism between the rotor and the stator of the generator to provide an electrical energy required for exciting the laser light of the laser generator.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A laser alignment device of a circular saw, comprising a rotary disk base, a protective cover, and a magnetic ring base, wherein:

the rotary disk base is provided with a hollow lug protruded outward therefrom, the hollow lug has a shaft hole for passage of a drive shaft of the circular saw, multiple silicon steel plates are secured on the hollow lug, an armature coil is mounted around the hollow lug between the silicon steel plates, the rotary disk base is provided with a laser generator, the rotary disk base is formed with a light permeable hole aligned with the laser generator, the light permeable hole of the rotary disk base is in parallel with and close to a circular saw blade of the circular saw, so that a laser light emitted from the laser generator can be projected on a predetermined cutting position of the circular saw blade exactly;

the protective cover is screwed on one side of the rotary disk base to cover and fix the rotary disk base, thereby providing a dustproof and positioning effect;

the magnetic ring base is secured to a gear box of an end side of a motor of the circular saw, and is provided with a stator member of a magnetic ring, the stator member of the magnetic ring of the magnetic ring base is mounted around a periphery of a rotor member of the silicon steel plates of the rotary disk base, thereby forming a rotation generator mechanism between the rotor member and the stator member of the magnetic ring; and the circular saw blade and a housing can be serially mounted on the other side of the rotary disk base, the drive shaft of the circular saw can be in turn extended through the circular saw blade and the housing, and can be screwed with a bolt, thereby mounting the circular saw blade and the housing on the drive shaft of the circular saw integrally.

2. The laser alignment device of a circular saw in accordance with claim 1, wherein the rotary disk base is provided with a circuit board, and a press switch.

3. The laser alignment device of a circular saw in accordance with claim 2, wherein the press switch has an inner side elastically rested on a slide press block, so that when the rotary disk base is rotated at a high speed, the slide press block can be driven to slide outward due to a centrifugal action to touch and press the press switch, thereby forming an electrically connection state.

4. The laser alignment device of a circular saw in accordance with claim 1, wherein the drive shaft of the circular saw is located in the gear box of the end side of the motor, and a rotation shaft of the motor is meshed with a gear secured on the drive shaft of the circular saw, whereby the rotation shaft of the motor can rotate the drive shaft of the circular saw so as to rotate the rotary disk base, so that the rotary disk base can be rotated at a high speed by the rotation force of the rotation shaft of the motor, and the silicon steel plates and the armature coil of the rotary disk base can be rotated at a high speed by the rotation force of the rotation shaft of the motor, so that an induced current can be produced between the silicon steel plates and the armature coil of the rotary disk base and the stator member of the magnetic ring of the magnetic ring base, so as to provide an electrical energy to the laser generator.

* * * * *